United States Patent
Jarng

(10) Patent No.: US 11,870,548 B2
(45) Date of Patent: Jan. 9, 2024

(54) MOBILE TERMINAL HAVING INTEGRATED RADIO FUNCTION, AND INTEGRATED RADIO SYSTEM USING SAME

(71) Applicant: ALGORKOREA CO. LTD, Seoul (KR)

(72) Inventor: Dongsoo Jarng, Seoul (KR)

(73) Assignee: ALGORKOREA CO. LTD, Seoul (KR)

( * ) Notice: Subject to any disclaimer, the term of this patent is extended or adjusted under 35 U.S.C. 154(b) by 65 days.

(21) Appl. No.: 17/629,196

(22) PCT Filed: Jul. 22, 2019

(86) PCT No.: PCT/KR2019/009024
§ 371 (c)(1),
(2) Date: Jan. 21, 2022

(87) PCT Pub. No.: WO2021/015314
PCT Pub. Date: Jan. 28, 2021

(65) Prior Publication Data
US 2022/0255649 A1 Aug. 11, 2022

(51) Int. Cl.
*H04H 20/57* (2008.01)
*H04M 1/72403* (2021.01)
*H04H 60/16* (2008.01)

(52) U.S. Cl.
CPC ............ *H04H 20/57* (2013.01); *H04H 60/16* (2013.01); *H04M 1/72403* (2021.01)

(58) Field of Classification Search
CPC .......... H04M 1/72403; H04M 1/72409; H04H 20/57; H04H 60/16; H04H 20/08; H04N 21/434; H04N 21/81
See application file for complete search history.

(56) References Cited

U.S. PATENT DOCUMENTS

| 6,389,463 B2 * | 5/2002 | Bolas ........................ H04L 9/40 709/227 |
| 6,609,039 B1 * | 8/2003 | Schoen .................. H04H 60/95 375/216 |

(Continued)

FOREIGN PATENT DOCUMENTS

| CA | 2414183 C | * | 2/2011 | ......... G06K 9/00718 |
| CA | 2358226 C | * | 3/2013 | ............. H04H 20/02 |

(Continued)

OTHER PUBLICATIONS

R. Rebhan, S. Olsson, B. Wergeland, P. Karlsson and O. Franceschi, "Multimedia goes mobile in broadcast networks," in IEEE MultiMedia, vol. 4, No. 2, pp. 14-22, Apr.-Jun. 1997, doi: 10.1109/93.591176. (Year: 1997).*

(Continued)

*Primary Examiner* — Berhanu Tadese
(74) *Attorney, Agent, or Firm* — The PL Law Group, PLLC

(57) ABSTRACT

A mobile terminal having an integrated radio function according to an embodiment of the present disclosure includes an antenna configured to receive a digital radio signal, a radio connection module configured to support connection and communication with an analog radio, a display configured to play at least one of an audio signal, an image signal, and additional information, and a radio application configured to restore the audio signal, the image signal, and the additional information by decoding the digital radio signal and then play the audio signal, the image signal, and the additional information through the display, and transmit the audio signal to the analog radio when the analog radio is connected.

5 Claims, 4 Drawing Sheets

(56) References Cited

U.S. PATENT DOCUMENTS

| | | | | |
|---|---|---|---|---|
| 6,654,367 | B1* | 11/2003 | Kaufman | H04M 1/2535 |
| | | | | 370/356 |
| 6,952,595 | B2* | 10/2005 | Ikedo | H04N 21/43637 |
| | | | | 455/3.06 |
| 8,180,470 | B2* | 5/2012 | Pahuja | H04L 5/06 |
| | | | | 455/61 |
| 8,200,183 | B2* | 6/2012 | Aftelak | H04W 76/50 |
| | | | | 455/423 |
| 8,243,755 | B2* | 8/2012 | Jeong | H04M 1/72409 |
| | | | | 370/466 |
| 8,406,684 | B1 | 3/2013 | Yeh et al. | |
| 8,737,454 | B2* | 5/2014 | Wala | H04B 1/18 |
| | | | | 375/220 |
| 9,478,855 | B2* | 10/2016 | Judd | H04B 7/18517 |
| 9,768,857 | B1* | 9/2017 | Judd | H04B 7/185 |
| 10,033,090 | B2* | 7/2018 | Merricks | H04W 4/80 |
| 10,187,568 | B1* | 1/2019 | Tran | H04N 13/194 |
| 10,312,949 | B2* | 6/2019 | Chaplet | H04B 7/24 |
| 10,969,467 | B1* | 4/2021 | Dunn | H04W 12/79 |
| 2004/0116069 | A1* | 6/2004 | Fadavi-Ardekani | H04H 60/74 |
| | | | | 455/3.02 |
| 2005/0144640 | A1* | 6/2005 | Fritsch | H04N 21/47214 |
| | | | | 348/E7.071 |
| 2006/0292980 | A1* | 12/2006 | Marcos Alba | H04H 60/13 |
| | | | | 455/3.06 |
| 2007/0021052 | A1* | 1/2007 | Boice | H04W 4/18 |
| | | | | 455/3.01 |
| 2007/0025393 | A1* | 2/2007 | Jeong | H04M 1/72409 |
| | | | | 370/328 |
| 2007/0171891 | A1* | 7/2007 | Tran | H04N 21/41407 |
| | | | | 370/352 |
| 2010/0173602 | A1* | 7/2010 | Muramatsu | H04N 21/41407 |
| | | | | 455/556.1 |
| 2010/0279629 | A1* | 11/2010 | Srinivasan | H04B 1/3805 |
| | | | | 455/74 |
| 2014/0016682 | A1* | 1/2014 | Rexberg | H04B 7/0413 |
| | | | | 375/219 |
| 2015/0162938 | A1* | 6/2015 | Yew | H04B 1/006 |
| | | | | 455/77 |
| 2016/0005079 | A1 | 1/2016 | Courtney, III et al. | |
| 2017/0055077 | A1* | 2/2017 | Merricks | H04R 3/12 |
| 2019/0116314 | A1* | 4/2019 | Tran | H04M 1/72412 |
| 2022/0255649 | A1* | 8/2022 | Jarng | H04M 1/72403 |
| 2022/0303731 | A1* | 9/2022 | Jarng | G06F 3/048 |
| 2022/0321689 | A1* | 10/2022 | Jarng | H04R 1/1083 |

FOREIGN PATENT DOCUMENTS

| | | | | |
|---|---|---|---|---|
| CA | 3106716 | A1 * | 7/2022 | G01S 19/18 |
| CN | 1237863 | A * | 12/1999 | G06K 17/00 |
| CN | 1176560 | C * | 11/2004 | G06K 17/00 |
| CN | 1905683 | A * | 1/2007 | H04H 40/27 |
| CN | 1998233 | A * | 7/2007 | H04H 20/46 |
| CN | 100417217 | C * | 9/2008 | C08G 63/20 |
| CN | 102171677 | A * | 8/2011 | H04H 60/12 |
| CN | 1998233 | B * | 12/2011 | H04H 20/46 |
| CN | 102171677 | B * | 8/2014 | H04H 60/12 |
| CN | 108352849 | A * | 7/2018 | G06F 1/18 |
| CN | 110268646 | A * | 9/2019 | H04B 17/382 |
| EP | 1526666 | A2 * | 4/2005 | H04H 20/06 |
| EP | 1587290 | A2 * | 10/2005 | G06F 16/48 |
| EP | 1748583 | A2 * | 1/2007 | H04H 40/27 |
| EP | 1950721 | A1 * | 7/2008 | G08B 27/005 |
| EP | 1993300 | A1 * | 11/2008 | H04W 60/00 |
| EP | 1190336 | B1 * | 11/2011 | H04H 20/82 |
| EP | 2260478 | B1 * | 7/2013 | H04M 11/04 |
| EP | 2697863 | B1 * | 10/2015 | H01Q 3/26 |
| EP | 3345305 | B1 * | 7/2019 | G06F 1/18 |
| GB | 2525282 | A * | 10/2015 | F03D 80/82 |
| GB | 2523903 | B * | 8/2017 | F03D 80/82 |
| JP | 2005130460 | A * | 5/2005 | H04H 20/06 |
| JP | 3677037 | B2 * | 7/2005 | H04H 20/06 |
| JP | 2008017292 | A * | 1/2008 | H03J 1/0091 |
| JP | 4057809 | B2 * | 3/2008 | G06Q 20/045 |
| JP | 2009065317 | A * | 3/2009 | |
| JP | 4635163 | B2 * | 2/2011 | H04H 20/82 |
| KR | 2015061808 | A * | 6/2015 | H04H 20/47 |
| NZ | 521111 | A * | 12/2005 | H04H 60/13 |
| WO | WO-9913644 | A1 * | 3/1999 | H04B 7/18582 |
| WO | WO-0077655 | A1 * | 12/2000 | H04H 20/82 |
| WO | WO-0161892 | A2 * | 8/2001 | H04H 60/13 |
| WO | WO-02054651 | A2 * | 7/2002 | G06Q 30/02 |
| WO | WO-03032640 | A1 * | 4/2003 | H04H 20/10 |
| WO | WO-2006016735 | A1 * | 2/2006 | H04H 20/46 |
| WO | WO-2009111410 | A1 * | 9/2009 | H04M 11/04 |
| WO | WO-2010014226 | A1 * | 2/2010 | H04H 60/12 |
| WO | WO-2010068333 | A2 * | 6/2010 | H04B 1/006 |
| WO | WO-2015121609 | A1 * | 8/2015 | F03D 80/82 |
| WO | WO 2017-003022 | A1 | 1/2017 | |
| WO | WO-2021015314 | A1 * | 1/2021 | H04H 20/57 |
| WO | WO-2021015315 | A1 * | 1/2021 | H04M 1/6058 |
| WO | WO-2021049683 | A1 * | 3/2021 | H04B 1/52 |
| WO | WO-2021157764 | A1 * | 8/2021 | |
| WO | WO-2022150901 | A1 * | 7/2022 | G01S 19/18 |

OTHER PUBLICATIONS

P. M. Petrovic, "Digitized speech transmission at VHF using existing FM mobile radios," in IEEE Transactions on Vehicular Technology, vol. 31, No. 2, pp. 76-88, May 1982, doi: 10.1109/T-VT.1982.23917. (Year: 1982).*

M. J. de-Ridder-de-Groote, R. Prasad and J. H. Bons, "Analysis of new methods for broadcasting digital data to mobile terminals over an FM-channel," in IEEE Transactions on Broadcasting, vol. 40, No. 1, pp. 29-37, Mar. 1994, doi: 10.1109/11.272418. (Year: 1994).*

J. Wenin, "ICs for Digital Cellular Communication," ESSCIRC '94: Twientieth European Solid-State Circuits Conference, Ulm, Germany, 1994, pp. 1-10. (Year: 1994).*

International Search Report for PCT/KR2019/009024 dated Apr. 28, 2020.

* cited by examiner

MOBILE TERMINAL HAVING INTEGRATED RADIO FUNCTION, AND INTEGRATED RADIO SYSTEM USING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/009024, filed Jul. 22, 2019, the entire contents of which are incorporated herein by reference.

BACKGROUND

1. Technical Field

The present disclosure relates to a mobile terminal having an integrated radio function and an integrated radio system using the same, and more particularly, to a mobile terminal having an integrated radio function for listening to a digital radio broadcast by combining an analog radio with the mobile terminal and an integrated radio system using the mobile terminal.

2. Background Art

Radio broadcasting is gradually changing from existing analog broadcasting to digital broadcasting.

This is because digital broadcasting, which is the transmission of radio using digital technology, has advantages in that sound quality is good and a frequency band for broadcasting may be finely divided and used, and thus broadcast channels may be more easily increased. Also, digital broadcasting has advantages in that text or video may also be broadcast, and thus more information may be provided to a user, and particularly, a frequency for broadcast reception does not need to be changed according to regions.

However, because digital broadcasting performs encoding by encoding sound, text, and data through compression and then transmits an encoded signal through RF radio waves, a dedicated receiver for restoring the encoded received signal is required for digital radio broadcast reception.

Accordingly, a digital radio broadcast may not be heard by using an existing analog radio. To this end, there is a problem in that an expensive digital radio including a digital processor device should be separately purchased and used.

A mobile terminal such as a smartphone or a tablet personal computer (PC) includes therein all elements required to listen to a digital radio broadcast, including an encoder and decoder for transmitting and receiving a digital signal and an application processor chip in which a central processing unit (CPU) and a graphics processing unit (GPU) are embedded.

SUMMARY

To solve the problems, the present disclosure provides a mobile terminal having an integrated radio function which may listen to a digital radio broadcast even through an analog radio by combining the analog radio with the mobile terminal, and an integrated radio system using the mobile terminal.

Also, the present disclosure provides a mobile terminal which may further maximize user utilization by allowing a digital radio broadcast to be recorded and played in units of files, and an integrated radio system using the mobile terminal.

Objectives of the present disclosure are not limited thereto, and other unmentioned objectives will be clearly understood by one of ordinary skill in the art to which the present disclosure pertains from the following description.

To solve the problems, according to an embodiment of the present disclosure, a mobile terminal having an integrated radio function includes: an antenna configured to receive a digital radio signal; a radio connection module configured to support connection and communication with an analog radio; a display configured to play at least one of an audio signal, an image signal, and additional information; and a radio application configured to restore the audio signal, the image signal, and the additional information by decoding the digital radio signal and then play the audio signal, the image signal, and the additional information through the display, and transmit the audio signal to the analog radio when the analog radio is connected.

The radio application may include: a channel selector configured to selectively receive the digital radio signal of a user-selected channel; a signal processor configured to restore the audio signal, the image signal, and the additional information by decoding the digital radio signal; and a controller configured to detect and notify the user-selected channel, and play the audio signal, the image signal, and the additional information through the display when the analog radio is not connected, but transmit the audio signal to the analog radio when the analog radio is connected.

The controller may be further configured to, when recording is requested, generate a recorded file including the audio signal, the image signal, and the additional information and store the recorded file in a mobile memory.

The controller may be further configured to, when a file search is requested, guide a recorded file list, and then read the audio signal, the image signal, and the additional information of a user-selected file from the mobile memory and play the audio signal, the image signal, and the additional information through the display.

To solve the problems, according to another embodiment of the present disclosure, an integrated radio system includes: an analog radio; and a mobile terminal including a radio application installed and executed therein to restore and play an audio signal, an image signal, and additional information by receiving and decoding a digital radio signal, and transmit the audio signal to the analog radio when the analog radio is connected.

As such, the present disclosure may enable an analog radio to additionally play a digital radio broadcast through simple combination with a mobile terminal, by allowing a digital radio signal to be converted into and provided as an analog signal by using a mobile terminal resource.

That is, the present disclosure may provide a digital radio function by installing and executing a radio application in a mobile terminal and then combining the mobile terminal with an analog radio, without separately purchasing an expensive digital radio.

Also, the present disclosure may enable a user to listen to required content anytime anywhere and utilize the content in more various ways, by allowing a digital radio broadcast to be recorded and played in units of files.

DETAILED DESCRIPTION

Figure 1:
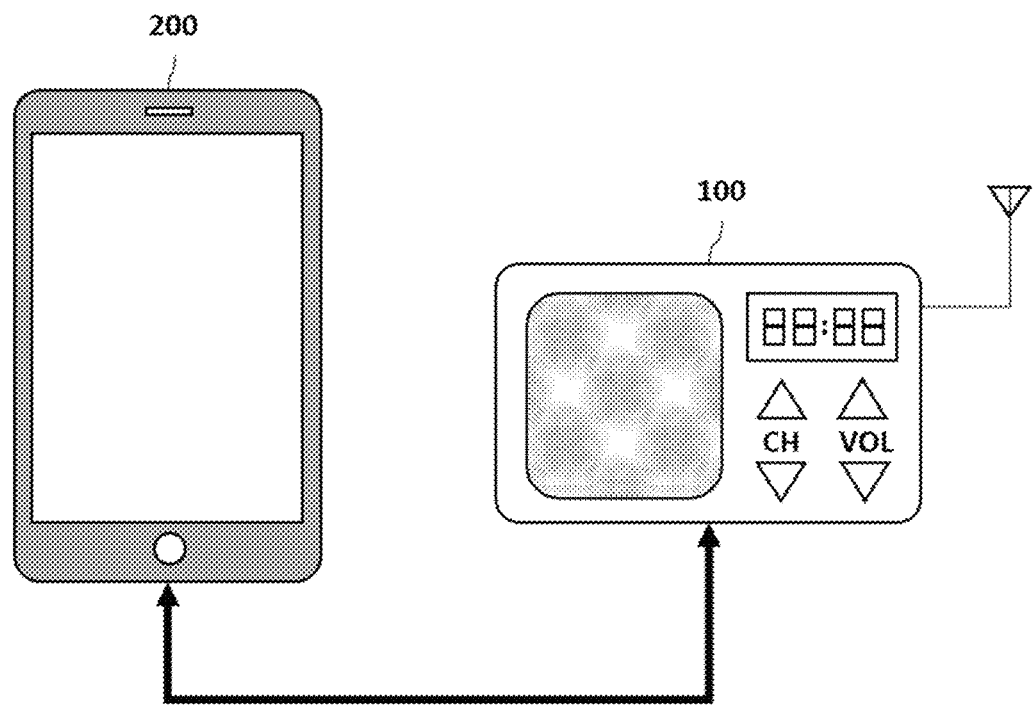
FIG. 1 is a view illustrating an integrated radio system, according to an embodiment of the present disclosure.

The following description illustrates only a principle of the present disclosure. Therefore, one of ordinary skill in the art may implement the principle of the present disclosure and invent various devices included in the spirit and scope of the present disclosure although not clearly described or shown in the present specification. In addition, it is to be understood that all conditional terms and exemplary embodiments mentioned in the present specification are basically intended only to allow one of ordinary skill in the art to understand a concept of the present disclosure, and the present disclosure is not limited to exemplary embodiments and states particularly mentioned as such.

Further, it is to be understood that all detailed descriptions mentioning a specific exemplary embodiment of the present disclosure as well as principles, aspects, and exemplary embodiments of the present disclosure are intended to include structural and functional equivalences thereof. Further, it is to be understood that these equivalences include an equivalence that will be developed in the future as well as an equivalence that is current well-known, that is, all devices invented so as to perform the same function regardless of a structure.

Therefore, it is to be understood that, for example, a block diagram of the present specification shows an illustrative conceptual aspect for embodying a principle of the present disclosure. Similarly, it is to be understood that all flowcharts, state transition diagrams, pseudo-code, and the like, show various processes that may be tangibly embodied in a computer-readable medium and that are executed by computers or processors regardless of whether or not the computers or the processors are clearly shown.

Functions of various devices including processors or functional blocks represented as concepts similar to the processors and shown in the accompanying drawings may be provided by hardware having capability to execute appropriate software as well as dedicated hardware. When the functions are provided by the processors, they may be provided by a single dedicated processor, a single shared processor, or a plurality of individual processors and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read-only memory (ROM), a random-access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro code, or the like, and are coupled to appropriate circuits for executing the software so as to execute these functions. It is to be understood that because functions provided by variously mentioned means are combined with each other and are combined with a scheme demanded by the claims in the present disclosures defined by the claims, any means capable of providing these functions are equivalent to means recognized from the present specification.

The above-mentioned objects, features, and advantages will become more obvious from the following detailed description provided in relation to the accompanying drawings. Therefore, one of ordinary skill in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted.

FIG. 1 is a view illustrating an integrated radio system, according to an embodiment of the present disclosure.

As shown in FIG. 1, a system of the present disclosure includes an analog radio 100, and a mobile terminal 200 including a radio application installed and executed therein to restore and play an audio signal, an image signal, and additional information by receiving and decoding a digital radio signal and transmit the audio signal to the analog radio 100 when the analog radio 100 is connected.

That is, the mobile terminal 200 of the present disclosure may allow a digital radio broadcast to be heard by using the conventional analog radio 100 as it is without adding or changing a separate hardware device, by installing and executing the radio application capable of converting and providing a digital radio signal into an analog radio signal.

Figure 2:
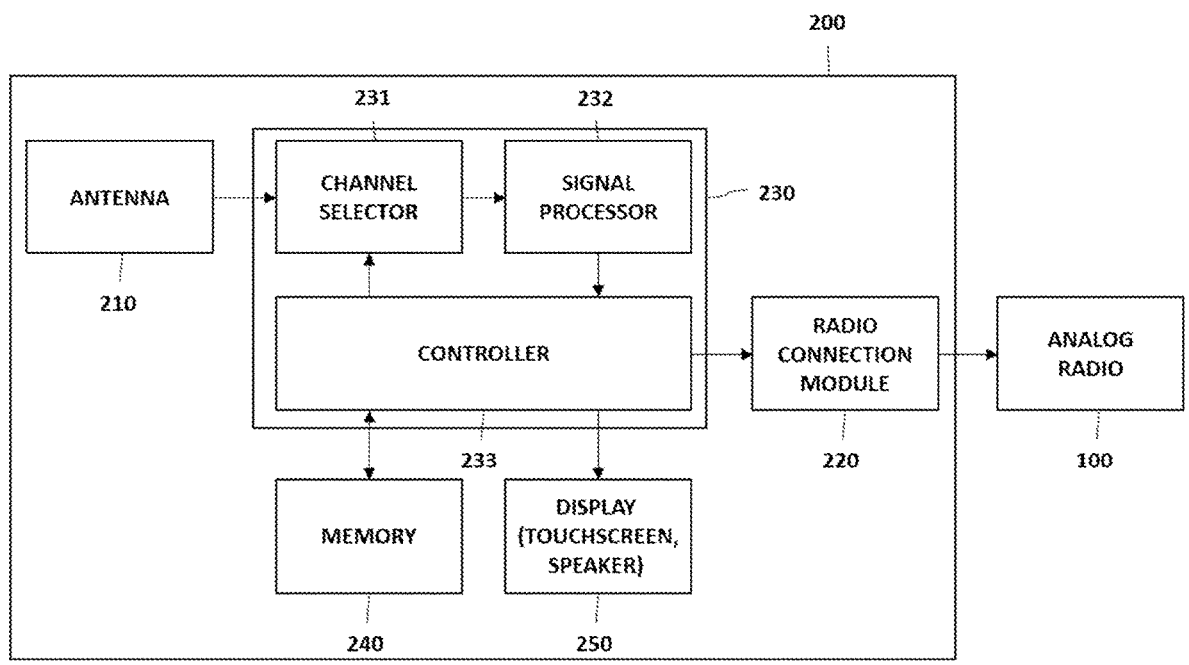
FIG. 2 is a diagram illustrating a detailed configuration of a mobile terminal having an integrated radio function, according to an embodiment of the present disclosure.

FIG. 2 is a diagram illustrating a detailed configuration of a mobile terminal having an integrated radio function, according to an embodiment of the present disclosure.

As shown in FIG. 2, the mobile terminal 200 of the present disclosure includes an antenna 210, a radio connection module 220, a radio application 230, a memory 240, and a display 250.

The antenna 210 receives digital radio signals wirelessly transmitted by various broadcast stations.

The radio connection module 220 is implemented as at least one of an audio jack and a data terminal, and supports connection and communication with the analog radio 100.

The radio application 230 is configured to restore and play an audio signal, an image signal, and additional information (e.g., text and other content data) by decoding a digital radio signal received through the antenna 210, and transmit the audio signal to the analog radio when the analog radio is connected.

In more detail, a plurality of tuners (e.g., a DAB/HD radio tuner, an AM/FM tuner, and an Internet radio tuner) for receiving broadcasting signals of different standards are provided, and the radio application 230 includes a channel selector 231 configured to selectively receive only a digital radio signal of a user-selected channel by controlling the plurality of tuners, a signal processor 232 configured to restore an audio signal, an image signal, and additional information by decoding the digital radio signal, and a controller 233 configured to detect and notify the user-selected channel, and play the audio signal, the image signal, and the additional information through the display when the analog radio is not connected, but transmit the audio signal itself or convert the audio signal into a signal recognizable by the analog radio 100 and then transmit the signal to the analog radio 100 when the analog radio 100 is connected.

In addition, the controller 233 may be further configured to provide a file recording function and a file search function to store and play the audio signal, the image signal, and the additional information obtained by the signal processor 232 in units of files.

The memory 240 is configured to store the audio signal, the image signal, and the additional information in units of files under the control of the radio application 230.

The display 250 is implemented as a touchscreen, a speaker, or the like, and is configured to play at least one of the audio signal, the image signal, and the additional information under the control of the radio application 230.

Figure 3:
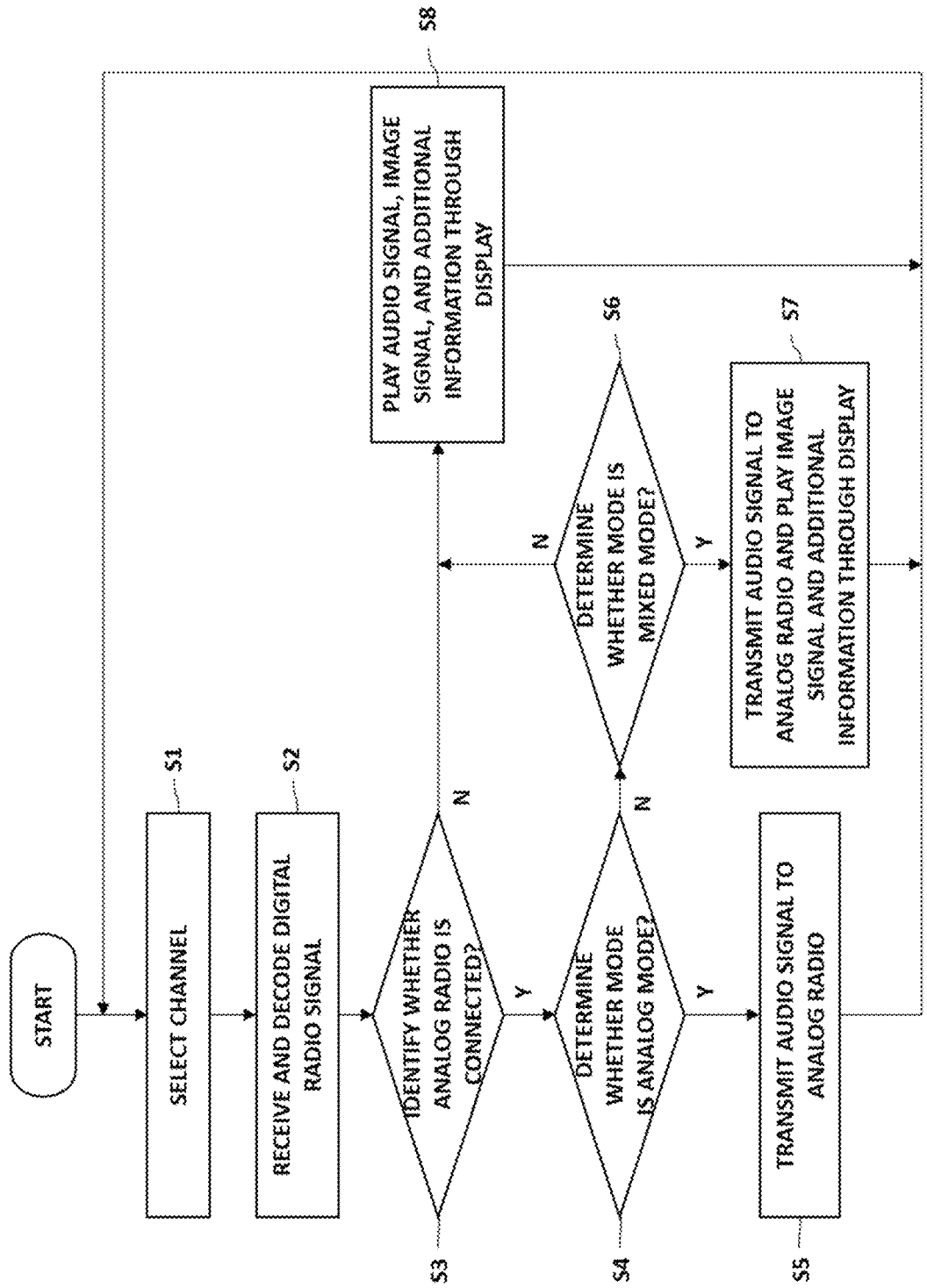
FIGS. 3 and 4 are diagrams for describing an operating method of a radio application, according to an embodiment of the present disclosure.
Figure 4:
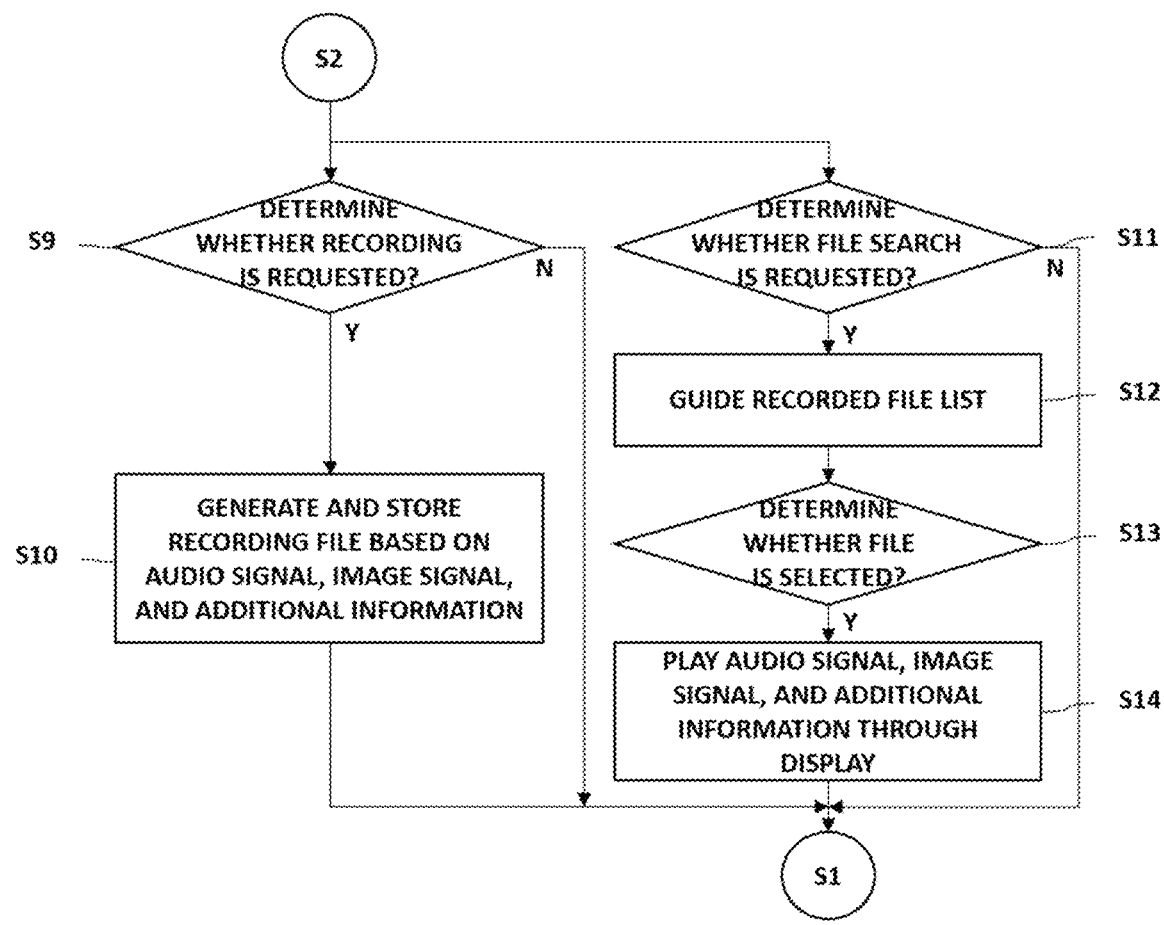

FIGS. 3 and 4 are diagrams for describing an operating method of a radio application, according to an embodiment of the present disclosure.

First, when the radio application 230 is executed, the radio application 230 starts to selectively receive only a radio signal of a user-selected channel, by inquiring a user of a broadcast channel desired to be heard (S1).

The radio application 230 starts to restore an audio signal, an image signal, and additional information by decoding the received digital radio signal (S2).

The radio application 230 identifies whether an analog radio is connected (S3), and then additionally inquires the user about a broadcast listening mode when the analog radio is connected (S4).

When the user selects an analog mode (S4), the radio application transmits the audio signal restored in operation S2 to the analog radio (S5).

In contrast, when the user selects a mixed mode (S6), the radio application transmits the audio signal restored in operation S2 to the analog radio, and allows the image signal and the additional information restored in operation S2 to be played through the display (S7).

When the analog radio is not connected, the radio application allows all of the audio signal, the image signal, and the additional information restored in operation S2 to be played through the display 250 (S8).

When the user requests radio recording in this state (S9), the radio application 230 allows all of the audio signal, the image signal, and the additional information restored in operation S2 to be recorded in units of files and stored in the memory 240 (S10).

In this case, a file name of a recorded file may be automatically generated according to preset rules, for example, based on a recording time, a broadcast channel, etc. Also, when the user is allowed to tag additional information such as importance, channel name, and broadcast date to each recorded file, the user may search and select a required file based on the additional information as well as the recorded file name in the future.

When the user requests a file search in this state (S11), the radio application configures and guides a recorded file list based on the recorded files stored in the memory 240 (S12).

Accordingly, when the user selects one file in the recorded file list and requests listening (S13), the radio application allows the audio signal, the image signal, and the additional information corresponding to the corresponding file to be read from the memory 240 and played through at least one of the display 250 and the analog radio 100 (S14).

The method according to the present embodiment may be embodied as a program executed in a computer and may be stored in a computer-readable recording medium, and examples of the computer-readable recording medium include read-only memories (ROMs), random-access memories (RAMs), CD-ROMs, magnetic tapes, floppy disks, optical data storage devices, and carrier waves (e.g., data transmission through the Internet).

The computer-readable recording medium may be distributed among computer systems that are interconnected through a network so that computer-readable code is stored and executed in a distributed fashion. Functional programs, code, and code segments for embodying the present disclosure may be easily derived by programmers in the technical field to which the present disclosure pertains.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A mobile terminal having an integrated radio function, the mobile terminal comprising:
   an antenna configured to receive a digital radio signal;
   a radio connection module configured to support connection and communication with an analog radio;
   a display configured to play an audio signal, an image signal, and additional information; and
   a radio application unit configured to:
     restore the audio signal, the image signal, and the additional information by decoding the digital radio signal; and
     when a broadcast listening mode is an analog mode and the analog radio is connected, transmit the audio signal to the analog radio;
     when a broadcast listening mode is a mixed mode and the analog radio is connected, play the image signal and the additional information through the display, and transmit the audio signal to the analog radio; and
     when the analog radio is not connected, play the audio signal, the image signal, and the additional information through the display.

2. The mobile terminal of claim 1, wherein the radio application unit comprises:
   a channel selector configured to selectively receive the digital radio signal of a user-selected channel;
   a signal processor configured to restore the audio signal, the image signal, and the additional information by decoding the digital radio signal; and
   a controller configured to detect and notify the user-selected channel, and play the audio signal, the image signal, and the additional information through the display when the analog radio is not connected, but transmit the audio signal to the analog radio when the analog radio is connected.

3. The mobile terminal of claim 2, wherein the controller is further configured to, when recording is requested, generate a recorded file comprising the audio signal, the image signal, and the additional information and store the recorded file in a mobile memory.

4. The mobile terminal of claim 3, wherein the controller is further configured to, when a file search is requested, guide a recorded file list, and then read the audio signal, the image signal, and the additional information of a user-selected file from the mobile memory and play the audio signal, the image signal, and the additional information through the display.

5. An integrated radio system comprising:
   an analog radio; and
   a mobile terminal comprising a radio application unit installed and executed therein to restore and play an audio signal, an image signal, and additional information by receiving and decoding a digital radio signal, and transmit the audio signal to the analog radio when the analog radio is connected, the mobile terminal comprising:

an antenna configured to receive a digital radio signal;

a radio connection module configured to support connection and communication with an analog radio;

a display configured to play an audio signal, an image signal, and additional information; and a radio application unit configured to:
- restore the audio signal, the image signal, and the additional information by decoding the digital radio signal; and
- when a broadcast listening mode is an analog mode and the analog radio is connected, transmit the audio signal to the analog radio;
- when a broadcast listening mode is a mixed mode and the analog radio is connected, play the image signal and the additional information through the display, and transmit the audio signal to the analog radio; and
- when the analog radio is not connected, play the audio signal, the image signal, and the additional information through the display.

* * * * *